Figure 6:
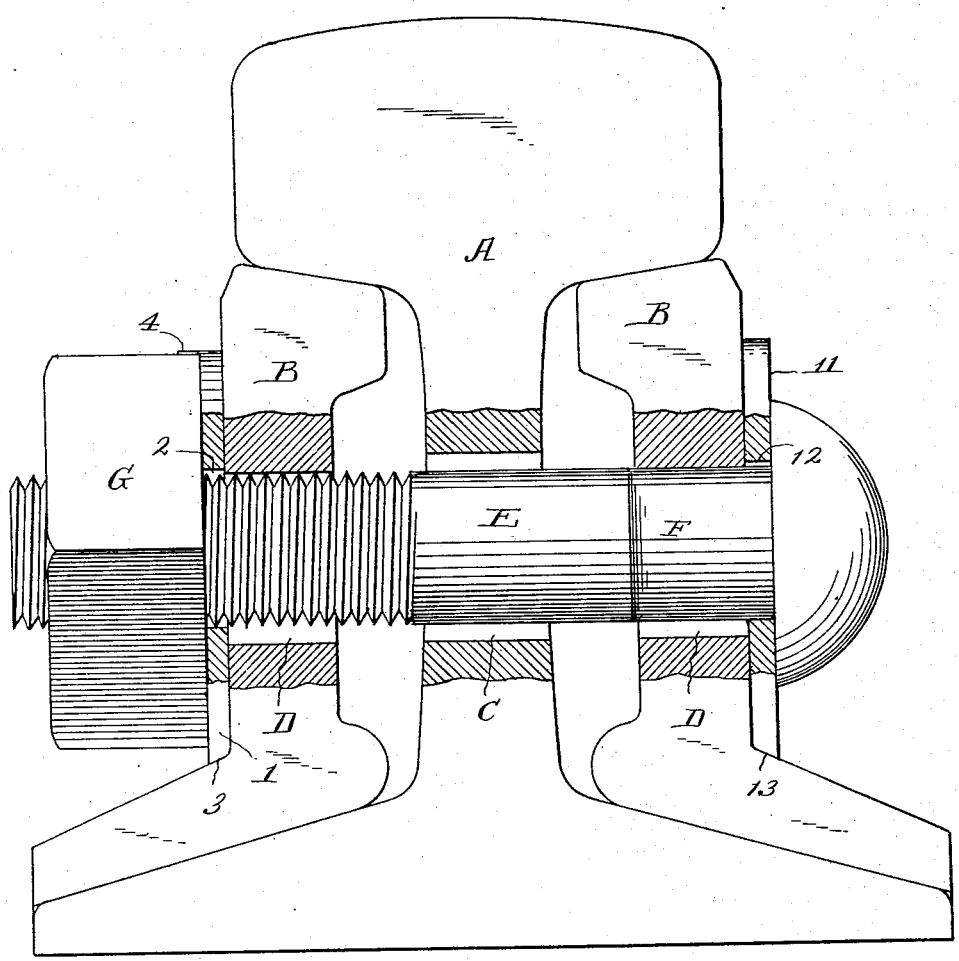

A. C. MILLER.
ANTI-BOLT-LOOSENING DEVICE.
APPLICATION FILED MAY 9, 1914.
1,177,348.
Patented Mar. 28, 1916.
2 SHEETS—SHEET 1.
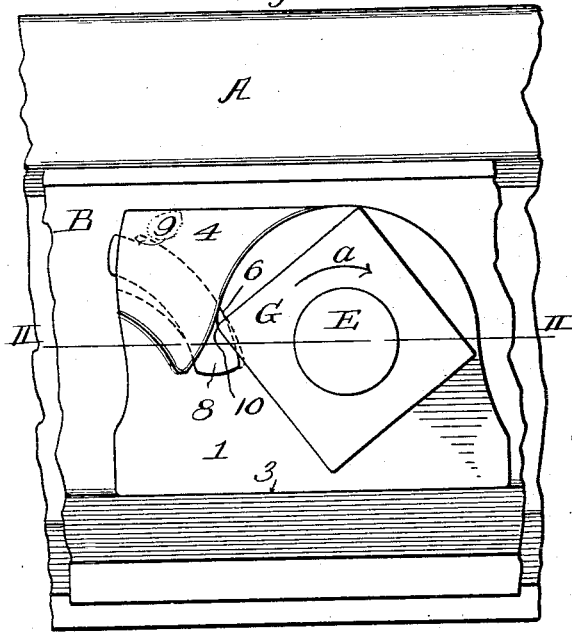
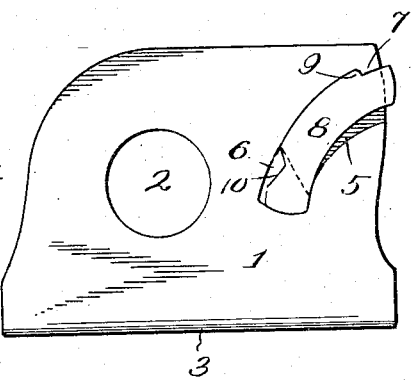
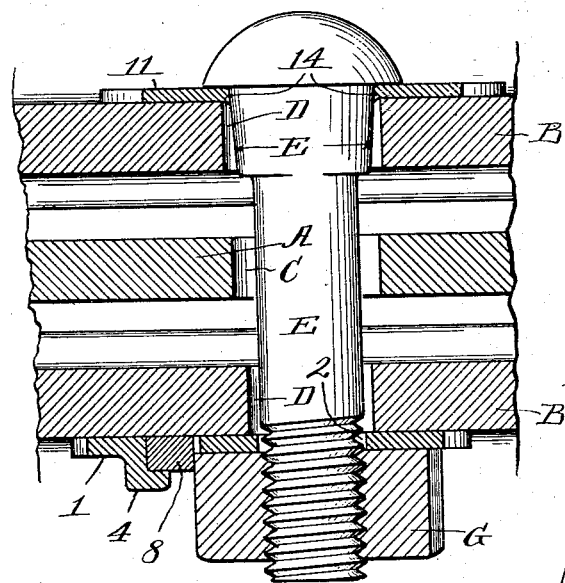
INVENTOR:
Alvin C. Miller,
BY
F. G. Fischer,
ATTORNEY.
WITNESSES:

A. C. MILLER.
ANTI-BOLT-LOOSENING DEVICE.
APPLICATION FILED MAY 9, 1914.

1,177,348.

Patented Mar. 28, 1916.
2 SHEETS—SHEET 2.

Witnesses
Fred A. Fischer,
L. J. Fischer

Inventor:
Alvin C. Miller,
By F. G. Fischer,
Attorney.

UNITED STATES PATENT OFFICE.

ALVIN C. MILLER, OF KANSAS CITY, MISSOURI.

ANTI-BOLT-LOOSENING DEVICE.

1,177,348. Specification of Letters Patent. Patented Mar. 28, 1916.

Application filed May 9, 1914. Serial No. 837,400.

*To all whom it may concern:*

Be it known that I, ALVIN C. MILLER, a citizen of the United States, residing at Kansas City, in the county of Jackson and State of Missouri, have invented certain new and useful Improvements in Anti-Bolt-Loosening Devices, of which the following is a specification.

My invention relates to an anti-bolt loosening device, and the invention, while susceptible of other uses, is especially adapted to preventing bolts with their nuts from becoming loose on rail joints.

I have determined by actual practice that rail joints cannot be maintained in a tight condition by merely locking the nuts thereof from rotating backward independently of the bolts. In order to accomplish the desired result the bolt as well as its nut must be reliably secured from lateral movement or rotation, excepting such times as it becomes necessary to rotate the nut with a wrench to either tighten or remove said nut. In order to accomplish the desired result I have produced coöperating elements which are so combined and arranged as to engage the bolt and its nut and thus prevent independent rotation or other movement of either, hence it will be impossible for the bolt to turn in the nut and become loose or the nut to turn on the bolt and become loose, excepting such times when the nut is rotated with a wrench, as above referred to.
In order that the invention may be fully understood, reference will now be made to the accompanying drawing, in which:

Figure 1 is a side elevation of a rail-joint provided with my device. Fig. 2 is a horizontal section on line II—II of Fig. 1. Fig. 3 is a side elevation of a bolt-holding plate with its detent. Fig. 4 is a detail perspective of a curved detent employed in carrying out the invention. Fig. 5 is a side elevation of a bolt-securing plate constituting one of the elements of the invention. Fig. 6 is an end view partly in section of a rail and joint provided with my device.

In the drawing, I have shown the device applied to a rail-joint consisting of the customary rails A and the angle-bars B, having holes C and D, respectively, for the passage of the bolts E, which fit loosely in said holes. Bolts E are provided at their ends adjacent their heads with the usual forwardly tapered lugs F, which fit loosely in the holes D of the adjacent angle-bar B.

G designates the customary nuts which screw upon the threaded ends of the bolts E.

1 designates a bolt-holding plate having a round hole 2 for the passage of bolt E, and a straight lower edge 3 to rest squarely upon the base of the adjacent angle-bar B, as disclosed by Fig. 1. The bolt-holding plate 1 is provided adjacent one corner with a projection 4 having a curved channel 5 communicating with an opening 6 near the bolt hole 2. Channel 5 flares upwardly and the upper end of its top wall terminates in a shoulder 7, for a purpose which will hereinafter appear. The convex sides of the channel 5 and the opening 6 are presented to the nut G, as disclosed by Fig. 1.

8 designates a curved detent operably-arranged in channel 5 and the opening 6, and provided at its upper end with a shoulder 9, which is held in engagement with the shoulder 7 when the nut G is bearing against the lower portion of said detent. The lower portion of the detent 8 has a recess 10 in its convex side to receive the adjacent corner of the nut G, as disclosed by Fig. 1.

11 designates a bolt-securing plate having an oblong or elliptical hole 12 for the passage of the bolt E, and a straight lower edge 13, which, like the edge 3 of the bolt-holding plate, fits securely upon the base of one of the angle-bars B. The margin of the bolt-securing plate 11, surrounding the hole 12, is serrated or corrugated as indicated at 14, for a purpose which will hereinafter appear.

In practice, when the angle-bars B are assembled with the rail A, the bolt-securing plate 11 is placed in position against one of the said angle-bars, while the bolt-holding plate 1 is placed against the companion angle-bar B. The bolt E is then placed through the whole until its forwardly tapered lugs F contact the corrugations or serrations 14, when the bolt is driven forward until its head rests squarely against the securing-plate 11, which reliably secures the bolt from turning in the holes C, D and 2. As the bolt is driven forward the corrugated or serrated margin 14 yields slightly, as disclosed by Fig. 2, and thus prevents buckling of the bolt-securing-plate 11. The nut G is then screwed upon the threaded end of the bolt E, until said nut firmly engages the adjacent side of the bolt-holding-plate 1.

When the nut G is rotated in the direction of arrow $a$ its corners contact the lower end of the detent 8 and intermittently lift the latter out of the path of said nut, the detent moving up freely as it rests upon the lower wall of the channel 5, so that its shoulder 9 will not contact the shoulder 7. After the nut G has been firmly screwed against the bolt-holding-plate 1, it is turned backward slightly until one of its corners engages the recessed portion 10 of the detent 8, which is thereby rocked into the position disclosed by Fig. 1, causing its shoulder 9 to engage the shoulder 7, and thus secure said detent 8 from being removed by persons mischievously or maliciously inclined.

When the nut G is turned backward slightly, as above described, the detent 8 is doubly locked by its shoulder 7 engaging the shoulder 9, and one corner of the nut G engaging the walls of the recess 10. By thus doubly locking the detent 8, it coacts with the nut G in assisting the bolt securing-plate 11 in holding the bolt E against rotation or other movement.

From the foregoing description it will be readily understood that the bolt E is positively held from rotation and lateral movement through the combination and coöperation of the bolt-securing-plate 11, the holding-plate 1, the nut G, and the detent 8. As the nut G is screwed upon the bolt E, the plates 1 and 11 slide upward on the sloping bases of the angle-iron B, and force the bolt into contact with the upper sides of the holes D, thereby preventing further movement in any direction of said plates and the bolt, due to the passing of car-wheels over the rail-joint. While the nut G may be turned in the direction of the arrow $a$ from time to time to take up any slack which may occur, said nut cannot be unscrewed from the bolt E, without first lifting the detent 8 out of the path of said nut, which may be accomplished after the nut has been turned forward sufficiently to clear the walls of the recess 10. Downward movement of the detent 8 is limited by the lower end of the opening 6.

While I have shown and described the preferred form of my invention, I reserve the right to make such changes in the construction, combination, and arrangement of parts as properly fall within the spirit and scope of the claims.

Having thus described my invention, what I claim and desire to secure by Letters Patent is:

1. The combination with a bolt and its nut, of a bolt-holding-plate having a hole to receive the bolt and a curved channel with its convex side presented to the nut, and a curved detent operably-arranged within said channel so that it may be moved into or out of the path of the rotative movement of the nut with respect to the bolt.

2. The combination with a bolt and its nut, of a bolt-holding-plate having a hole to receive the bolt and a curved channel with its convex side presented to the nut, a curved detent operably-arranged within said channel so that it may be moved into or out of the path of the rotative movement of the nut with respect to the bolt, and means to secure the bolt from rotation.

3. The combination with a bolt and its nut, of a non-rotatable bolt-holding plate having a bolt hole and a projection at one side of said bolt hole, said projection being provided with a channel curved in the arc of a circle and convexly curved with respect to the nut, said channel flaring toward its upper end, a shoulder on the bolt-holding plate projecting into the upper end of said channel, and a curved detent operably-arranged in said channel and adapted to be moved into or out of the path of rotative movement of the nut with respect to the bolt, said detent having a shoulder for engagement with the shoulder at the upper end of the channel when the nut is turned backward against the lower end of said detent.

4. In a device of the character described, a nonrotatable bolt-holding plate having a bolt hole and a projection at one side of said bolt hole provided with a curved upwardly flaring channel, a shoulder on said bolt-holding plate projecting into the upper end of said channel, and a curved detent operably-arranged in said channel and having a shoulder at its upper end for engagement with the first-mentioned shoulder and a recess in its lower portion.

5. The combination with a nut and a bolt with lugs at one end thereof, of a nonrotatable bolt-holding plate having a hole for the bolt and a projection at one side of said hole provided with a curved channel, a shoulder on said bolt-holding plate projecting into the upper end of the channel, a curved detent operably-arranged in said channel and having a shoulder at its upper end for engagement with the first-mentioned shoulder and a recess in its lower portion to receive any corner of the nut, and a bolt-securing plate having an elliptical hole to receive the lugged end of the bolt and its lugs.

6. The combination with a pair of rails and a pair of angle-bars arranged at opposite sides thereof and provided with bolt holes registering with bolt holes in said rails, bolts extending loosely through said holes, nuts on said bolts, bolt-securing plates having elliptical holes to receive the lugged ends of the bolts, bolt holding plates to receive the opposite ends of the bolts, said bolt securing and holding plates being adapted to bear against the lower portions of the angle-bars and firmly force the bolts against the upper sides of the holes in said angle-bars, and detents carried by the bolt holding plates and adapted to be moved into and out of the rotative movement of the nuts.

In testimony whereof I affix my signature, in the presence of two witnesses.

ALVIN C. MILLER.

Witnesses:
F. G. FISCHER,
FRED C. FISCHER.

Copies of this patent may be obtained for five cents each, by addressing the "Commissioner of Patents, Washington, D. C."